United States Patent [19]

Boyajian, Jr.

[11] Patent Number: 5,683,010
[45] Date of Patent: Nov. 4, 1997

[54] POT AND PAN LID HOLDER

[76] Inventor: Philip H. Boyajian, Jr., P.O. Box 191, Watertown, Mass. 02172

[21] Appl. No.: 526,594

[22] Filed: Sep. 11, 1995

[51] Int. Cl.$^6$ .................................................. B65D 25/20
[52] U.S. Cl. .................................................. 220/744
[58] Field of Search ........................... 220/744, 694, 220/735; 248/303, 302, 213.2

[56] References Cited

U.S. PATENT DOCUMENTS

| | | | |
|---|---|---|---|
| 459,598 | 9/1891 | Stiles | 220/774 |
| 670,502 | 3/1901 | Anderson . | |
| 1,103,491 | 7/1914 | Cormier | 248/302 |
| 1,196,737 | 8/1916 | Hammond . | |
| 1,237,504 | 8/1917 | Graham . | |
| 1,385,580 | 6/1921 | Owen . | |
| 1,717,556 | 6/1929 | Haese . | |
| 1,745,548 | 2/1930 | Lerner . | |
| 1,928,995 | 10/1933 | De Blasi | 53/8 |
| 3,163,385 | 12/1964 | Lazan, Jr. | 248/37.6 |
| 4,384,656 | 5/1983 | McQuiston et al. | 220/323 |
| 4,470,515 | 9/1984 | Boehm | 220/316 |
| 4,790,503 | 12/1988 | Pohler | 248/176 |
| 4,932,550 | 6/1990 | Moucha | 220/208 |
| 5,127,616 | 7/1992 | Carney | 248/176 |
| 5,293,813 | 3/1994 | Schultz | 99/337 |

FOREIGN PATENT DOCUMENTS

| | | | |
|---|---|---|---|
| 68844 | 6/1958 | France | 248/302 |
| 503059 | 7/1930 | Germany | 220/744 |
| 8729 | of 1899 | United Kingdom | 248/213.2 |

Primary Examiner—Stephen J. Castellano
Attorney, Agent, or Firm—David L. Volk; John Gugliotta

[57] ABSTRACT

According to one embodiment of the present invention, a continuous length of wire is shaped to include a pair of interlocking hooks, one each located at the end of a holding prong, and disposed outward. The prong extension traverses the inner side of a pan lid, and is of such a length as to allow the interlocking hooks at one end to protrude under any pan lid lip. The prong extension terminates at the bottom in a retaining hook and a catch notch. The catch notches are connected via a horizontal extension.

6 Claims, 5 Drawing Sheets

POT AND PAN LID HOLDER

BACKGROUND OF THE INVENTION

1. Field of the Invention

The present invention relates generally to lid or cover holders for containers and, more particularly, to a utensil that can hold and store a cooking pot or cooking pan lid during cooking activities.

2. Description of the Related Art

In the related art, many methods are known for securing lids to containers. For example, in U.S. Pat. No. 4,384,656, issued in the name of McQuiston et al., a trash receptacle having lid fastening means is disclosed. Although effective and theoretically adaptable for use with cooking pots or cooking pans, such a lid fastening means as disclosed in the McQuiston et al. reference is formed integral to a lid structure, and does not address the problems associated with holding and storing hot lids utilized during cooking activities.

Another problem occurs when cooking activities utilize a pressure cooking vessel. Many locking mechanisms have been developed to hold a lid onto a pot or pan that is pressurized. For example, in U.S. Pat. No. 4,932,550, issued in the name of Moucha, a pressure cooker interlock is disclosed. And again, in U.S. Pat. No. 4,470,515, issued in the name of Boehm, a steam pressure cooker fastening means is disclosed. Designed to maintain lid closure during pressurized cooking activities, devices made in accordance with the Moucha or Boehm references are not designed to solve the problem associated with a common activity encountered while cooking with ordinary pots and pans having lids, mainly the need to intermittently remove, hold, or store the hot lids of the pots or pans while performing various activities required during cooking.

Also known is U.S. Pat. No. 5,293,813, issued in the name of Schultz, wherein is disclosed a cooking pot with improved locking structure having a pot with a hinged lid attached which could conceivably be used to hold the lid in an open position while stirring, adding ingredients, or other similar cooking activities. However, such a design as disclosed in Schultz does not provide significant adaptability for use with ordinary, readily available cookware.

A need has therefore been felt for an improved but less complex device that can be utilized with existing and standard cookware to provide a method of holding hot lids for pots and pans out of the way, while at the same time keeping those lids nearby and convenient for use.

SUMMARY OF THE INVENTION

It is therefore an object of the present invention to provide an improved pot or pan lid holder.

It is another object of the present invention to provide an improved pot or pan lid holder which can be utilized while cooking.

It is another object of the present invention to provide an improved pot or pan lid holder which can be utilized with pan lids with an edge lip.

It is another object of the present invention to provide an improved pot or pan lid holder which can be adapted for use with pan lids not having an edge lip, i.e. cast iron, glass, etc.

It is another object of the present invention to provide an improved pot or pan lid holder which can be utilized while cooking and which allows the lid to catch condensation, thereby eliminating any "dripping" onto a stove top or other cooking surface.

It is yet another object of the present invention to provide an improved pot or pan lid holder which can be utilized while cooking and which allows the lid to act as a splatter shield, shielding the user from cooking related splatters.

It is also another object of the present invention to provide an improved pot or pan lid holder which can also be utilized as a storage hanger for pot or pan lids when used in conjunction with many standard wall-mounted pot or pan hangers.

Finally, it is yet another object of the present invention to provide an improved pot or pan lid holder which is inexpensive to manufacture and easy to utilize.

It is a feature of the present invention to provide an improved pot or pan lid holder comprised of a single continuous piece of shaped wire, made in various sizes, to accommodate standard cookware lids.

Briefly described according to one embodiment of the present invention, a continuous length of wire is shaped to include a pair of interlocking hooks, one each located at the end of a holding prong, and disposed outward. The prong extension traverses the inner side of a pan lid, and is of such a length as to allow the interlocking hooks at one end to protrude under any pan lid lip. The prong extension terminates at the bottom in a retaining hook and a catch notch. The catch notches are connected via a horizontal extension.

An advantage of the present invention is that it can securely hold any sized pot or pan lid having an edge lip.

Another advantage of the present invention is that it can securely hold any standard sized pot or pan lid not having an edge lip, such as with cast iron or glass cookware.

Yet other advantages of the present invention is that it can be utilized to hold pot or pan lids during the process of cooking, allowing for safe and easy access to the pot or pan lid while at the same time acting as a splatter shield, protecting either the user or a cooking surface against cooking related splatters.

Another advantage of the present invention is that it can be utilized in an alternate manner to hang pot or pan lids when used in conjunction with many standard wall mounted pot or pan holders.

Finally, another advantage of the present invention is that it can be utilized to hold a pot or pan lid while cooking in a manner which allows the lid to catch condensation, thereby eliminating any "dripping" onto the cooking surface.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
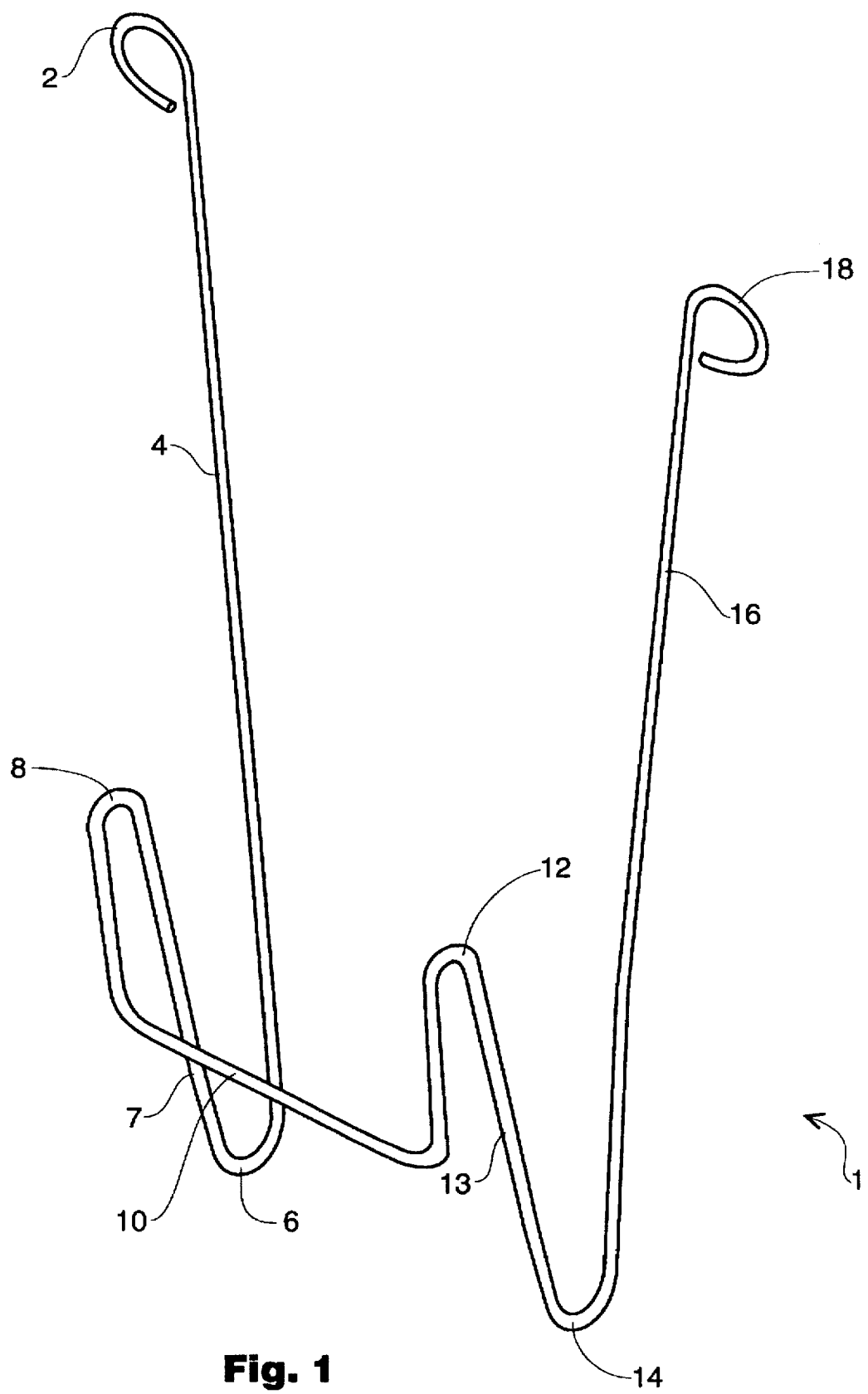
FIG. 1 is a perspective view of a pot or pan lid holder according to the preferred embodiment of the present invention.

Referring now to FIG. 1, a pot or pan lid holder, hereinafter holder 1 is shown, according to the present invention, depicting in its preferred embodiment a continuous, elongated wire bent into the required configuration. The required configuration results in, in order, a first interlocking hook 2 bent outward away from the centerline of the holder 1. Continuing, the first interlocking hook 2 terminates a first prong 4 which extends downward and ends at its opposite length with a first retaining hook 6. The first retaining hook 6 bends back up toward the first prong 4 to form an elongated first leg 7. A first catch notch 8 is formed at the distal end of the first prong 4. The first catch notch 8 turns generally perpendicularly and extends into a horizontal extension 10. At the opposite end of the horizontal extension 10 a mirror image configuration is affixed consisting, in order, of a second catch notch 12 bending downward into an elongated second leg 13. The second leg 13 extends downward into a second retaining hook 14. The second retaining hook 14 loops back up to form a second prong 16, which extends upward and terminates in a second interlocking hook 18, bent outward from the centerline of the holder 1 opposite the first interlocking hook 2.

Figure 2:
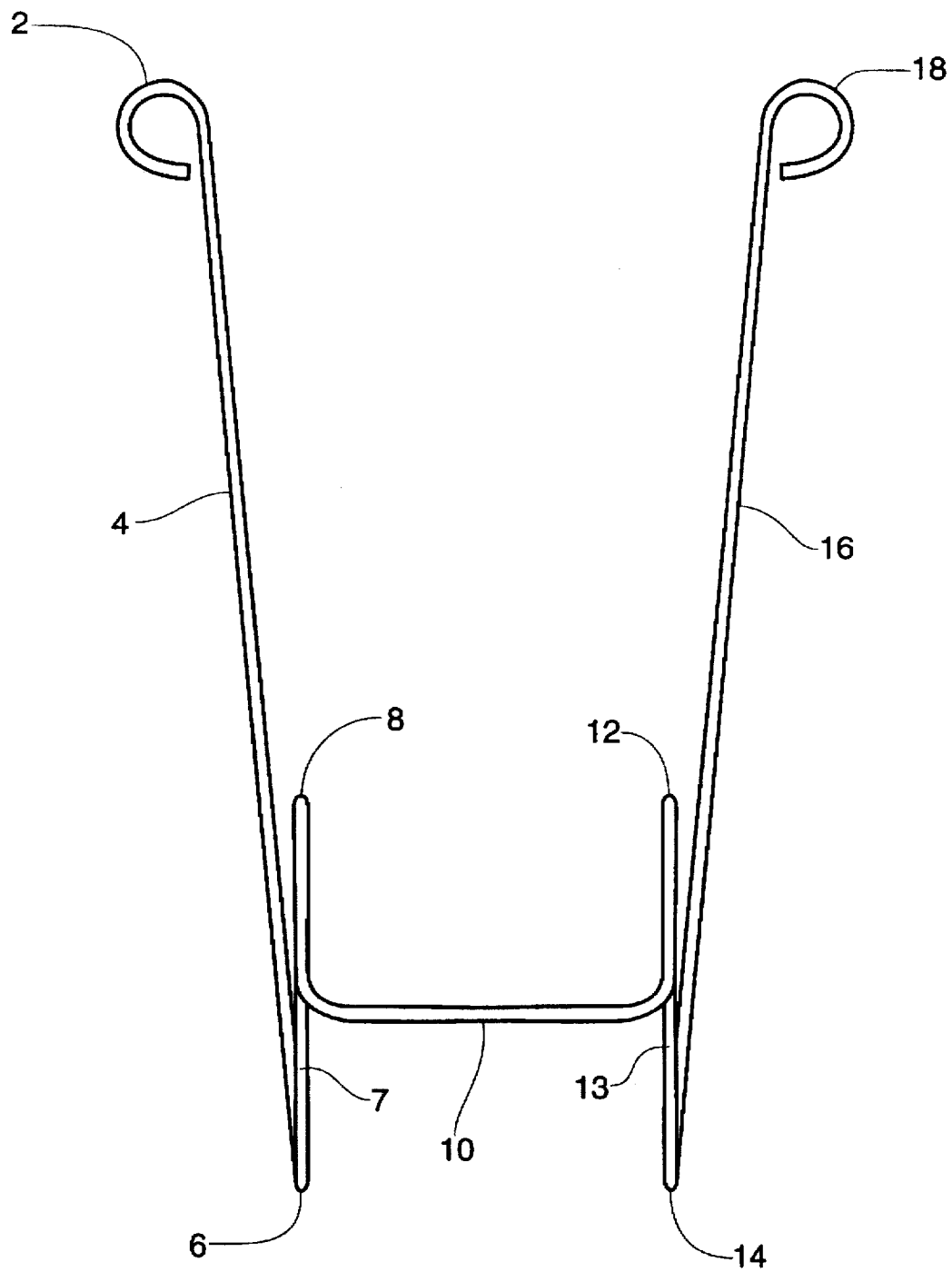
FIG. 2 is a front elevational view thereof.

Referring to FIG. 2, the angular orientation of the first prong 4 and second prong 16 to the horizontal extension 10 is more clearly depicted. The first prong 4 and second prong 16 are angled slightly outward away from one another. Due to a general standardization among pot and pan makers resulting from standard cooking element sizes for stoves, it has been found that in its preferred embodiment, the first prong 4 and second prong 16 provide the most useful functionality when manufactured to a length of 5 inches, 6½ inches, 8 inches, 10 inches, or 12 inches. This, in combination with a horizontal extension 10 of approximately 2 inches, provides for ease of utilization with a variety of lids, and in a variety of manners, as will be discussed further below.

Figure 3:
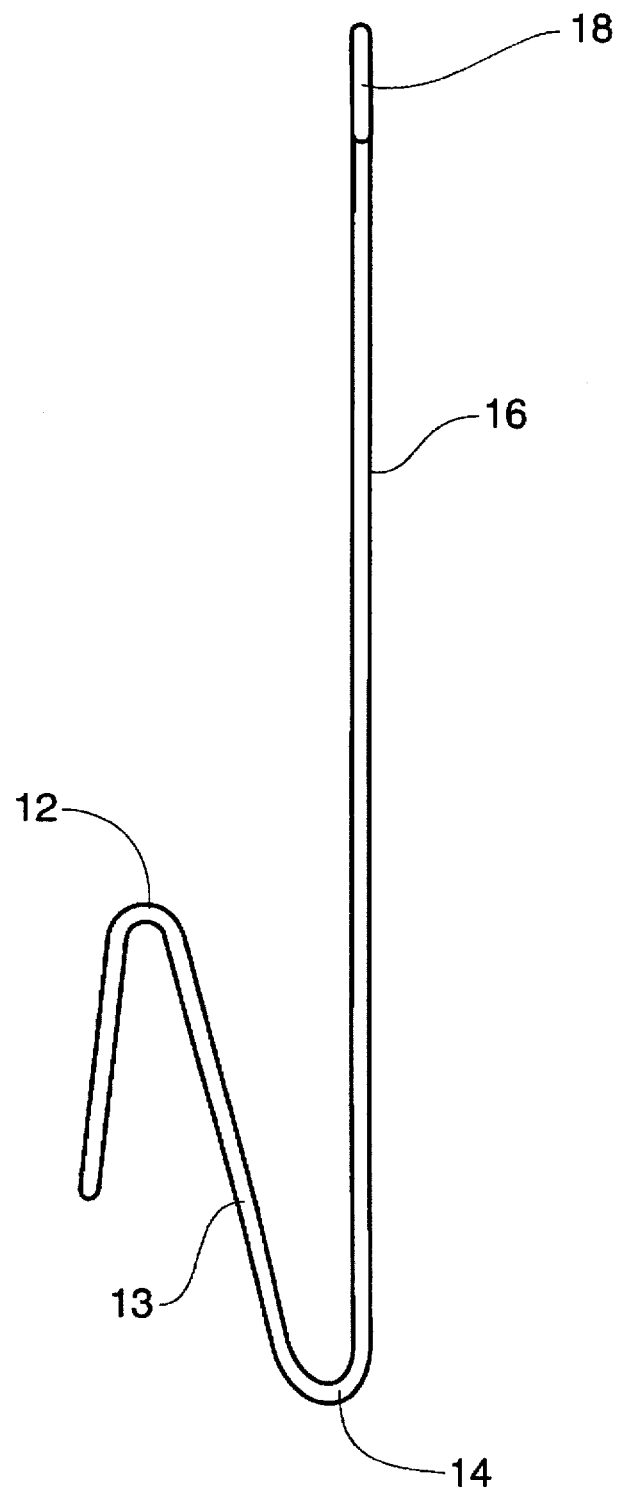
FIG. 3 is a side elevational view thereof.

FIG. 3 depicts further the necessary angular orientation of the first catch notch 8 and second catch notch 12 in relation to the first prong 4 and second prong 16.

2. Operation of the Preferred Embodiment

Figure 4A:
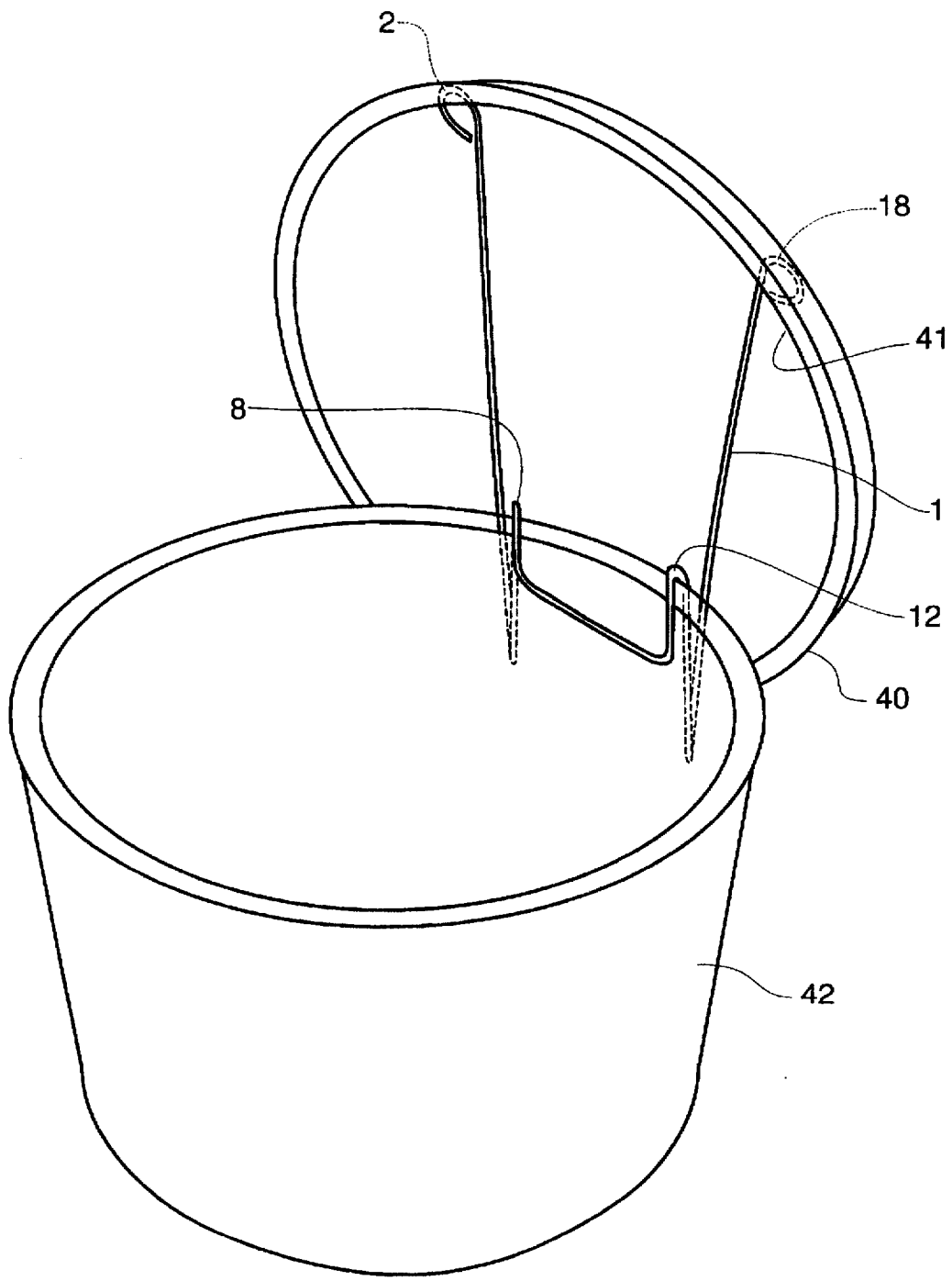
FIG. 4a is a perspective view of the present invention being utilized with a pot or pan lid having an inner lip.

In accordance with a preferred embodiment of the present invention, as shown in FIG. 4A the holder 1 is depicted in use with a standardized pot lid 40. When utilized with a pot lid 40 which has a lid lip 41. The first interlocking hook 2 and second interlocking hook 18 fit up under the lid lip 41, thereby holding it in an easily accessible manner. The first catch notch 8 and second catch notch 12 rest firmly and retain securely the holder 1 along the edge of the pot 42. Due to the unique angular orientation between the prongs 4 and 16, the lid 40 is held up, over, and away from the open area of the pot 42.

Figure 4B:
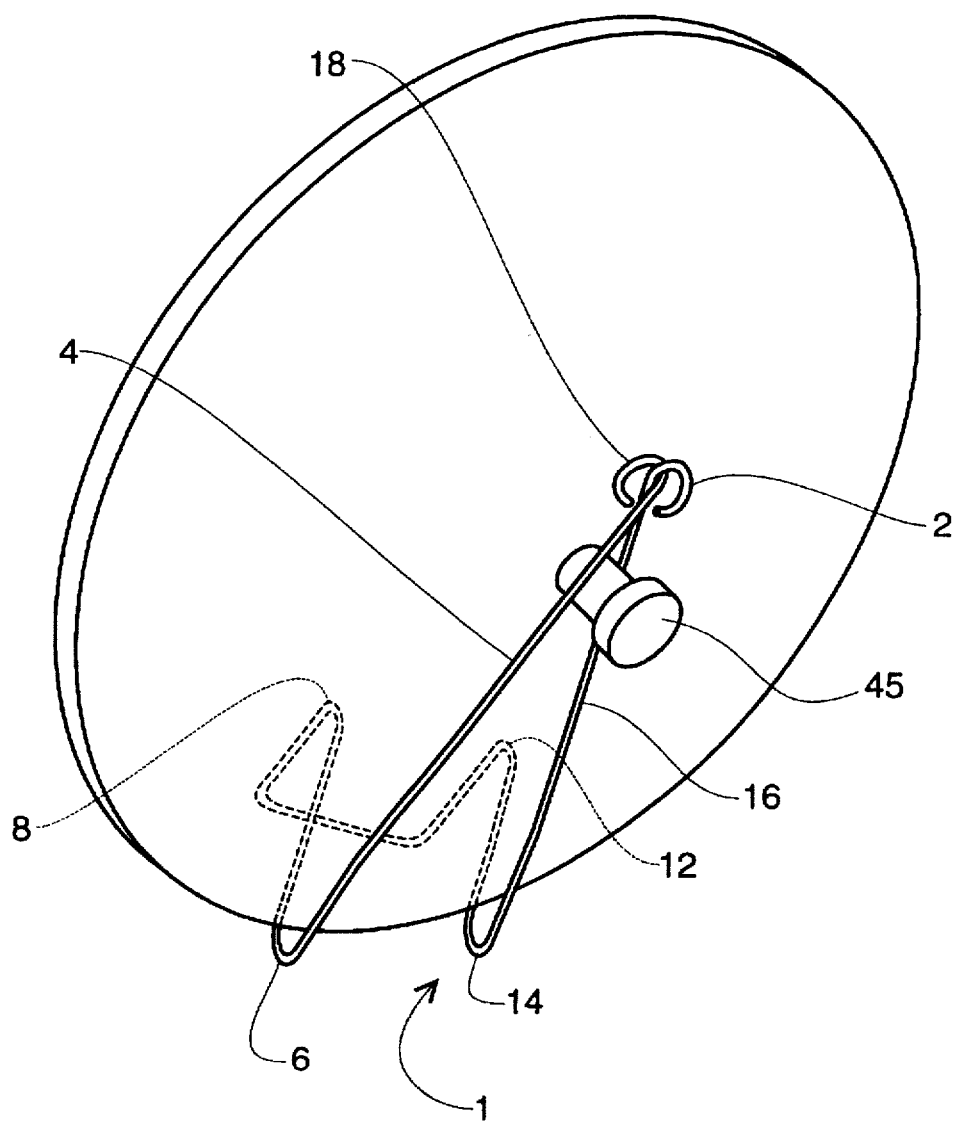
FIG. 4b is a perspective view of the present invention being utilized with a pot or pan lid lacking an inner lip.

In accordance with the preferred embodiment of the present invention, as shown in FIG. 4B, the holder 1 is depicted in use with a standardized pot lid 44 which does not have any lid lip. The first prong 4 and second prong 16 are squeezed together such that the first interlocking hook 2 is engaged with and hooked to the second interlocking hook 18. This provides a firm supporting structure in which to rest the lid 44. The edge of the lid 44 is rested down into the groove created by the first retaining hook 6 and second retaining hook 14. The lid surface is then rested against the prongs 4 and 16, with the lid handle 45 resting between the interlocked prongs 4 and 16. The first catch notch 8 and second catch notch 12 rest firmly and retain securely the holder 1 along the edge of a pot or pan, as described in FIG. 4A. Due to the unique angular orientation between the prongs 4 and 16, the lid 44 is held up, over, and away from the open area of the pot 42.

The foregoing description is included to illustrate the operation of the preferred embodiment and is not meant to limit the scope of the invention. Other alternate uses for the present invention are currently envisioned, such as functioning as a lid holding hook when used in conjunction with many readily available wall mounted pot or pan holders. Other future uses are also envisioned, therefore the scope of the invention is to be limited only by the following claims.

What is claimed is:

1. An improved lid holder for the temporary storage of a pot or pan lid adjacent a pot or pan, wherein said lid holder comprises the combination of:

a first elongated prong having a top end and a bottom end;

a second elongated prong having a top end and a bottom end;

a first interlocking hook formed integral to the top end of said first elongated prong;

a second interlocking hook formed integral to the top end of said second elongated prong, said second interlocking hook disposed opposite said first interlocking hook and formed such that said second interlocking hook is engageable with said first interlocking hook in an entwining manner;

a first retaining hook formed integral to the bottom end of said first elongated prong, said first retaining hook bending upward to form an elongated first leg, said first leg being shorter in length than said first elongated prong;

a second retaining hook formed integral to the bottom end of said second elongated prong, said second retaining hook bending upward to form an elongated second leg, said second leg being shorter in length than said second elongated prong;

a first catch notch formed at a first leg distal end;

a second catch notch formed at a second leg distal end; and a horizontal extension affixed to and connecting said first catch notch and said second catch notch.

2. The improved lid holder as described in claim 1, wherein said holder is formed of a continuous piece of elongated, bend wire.

3. The improved lid holder as described in claim 2, wherein said first retaining hook and said second retaining hook each bend outward away from the centerline of said lid holder.

4. The improved lid holder as described in claim 2, wherein said first elongated prong and said second elongated prong are each formed to an equal length of approximately either 5 inches, 6½ inches, 8 inches, 10 inches, or 12 inches.

5. The improved lid holder as described in claim 2, wherein said horizontal extension is approximately 2 inches in length.

6. The improved lid holder as described in claim 2, wherein said first elongated prong and said second elongated prong are formed angularly outward from each other and angularly away from both said first catch notch and said second catch notch.

* * * * *